(12) United States Patent
Gilbert (10) Patent No.: US 11,365,009 B2
(45) Date of Patent: Jun. 21, 2022

(54) SPRING CLUTCH ARM ASSEMBLY

(71) Applicant: Safran Seats USA LLC, Gainesville, TX (US)

(72) Inventor: Klay E. Gilbert, Lindsay, TX (US)

(73) Assignee: Safran Seats USA LLC, Gainesville, TX (US)

( * ) Notice: Subject to any disclaimer, the term of this patent is extended or adjusted under 35 U.S.C. 154(b) by 37 days.

(21) Appl. No.: 17/256,897

(22) PCT Filed: Jun. 29, 2018

(86) PCT No.: PCT/US2018/040360
§ 371 (c)(1),
(2) Date: Dec. 29, 2020

(87) PCT Pub. No.: WO2020/005279
PCT Pub. Date: Jan. 2, 2020

(65) Prior Publication Data
US 2021/0276718 A1 Sep. 9, 2021

(51) Int. Cl.
*B64D 11/06* (2006.01)
*F16M 13/02* (2006.01)
*F16M 11/12* (2006.01)
*F16M 11/20* (2006.01)
*F16F 1/12* (2006.01)
*F16M 11/10* (2006.01)
(Continued)

(52) U.S. Cl.
CPC .......... *B64D 11/0639* (2014.12); *F16F 1/123* (2013.01); *F16M 11/2035* (2013.01); *F16M 13/022* (2013.01); *B64D 11/00153* (2014.12); *B64D 11/0627* (2014.12); *F16M 11/10* (2013.01); *F16M 11/105* (2013.01);
(Continued)

(58) Field of Classification Search
CPC .......... B64D 11/0639; B64D 11/00153; B64D 11/0627; F16F 1/123; F16M 11/12; F16M 11/2035; F16M 13/022; F16M 11/10; F16M 11/105; F16M 11/08; F16M 2200/065;
(Continued)

(56) References Cited

U.S. PATENT DOCUMENTS 4,624,434 A 11/1986 Lake et al.
5,177,616 A * 1/1993 Riday .............. B64D 11/00153
348/827
(Continued)

FOREIGN PATENT DOCUMENTS

JP 2000297897 A 10/2000
JP 6296254 B2 * 3/2018 ........... B81B 7/0041
(Continued)

OTHER PUBLICATIONS

International Patent Application No. PCT/US2018/040360, International Search Report and Written Opinion, dated Mar. 28, 2019.

*Primary Examiner* — Tan Le
(74) *Attorney, Agent, or Firm* — Kilpatrick Townsend & Stockton LLP (57) ABSTRACT

A spring clutch arm assembly includes a moveable arm comprising a retracted configuration and a deployed configuration, a fixed shaft, and a spring portion comprising a moving portion with a distal end and a coil portion wrapped around the fixed shaft. The moveable arm may include a moveable member. The distal end may be attached to the moveable member. The moveable arm may be held in the deployed configuration by the spring portion.

17 Claims, 12 Drawing Sheets

(51) Int. Cl.
    *B64D 11/00* (2006.01)
(52) U.S. Cl.
    CPC ....... *F16M 11/12* (2013.01); *F16M 2200/044* (2013.01); *F16M 2200/065* (2013.01); *Y10S 248/917* (2013.01)
(58) Field of Classification Search
    CPC .......... F16M 2200/066; F16M 2200/04; Y10S 248/917
    See application file for complete search history.

(56) References Cited

U.S. PATENT DOCUMENTS

| | | | |
|---|---|---|---|
| 5,179,447 A * | 1/1993 | Lain | A47C 7/723 348/827 |
| 5,197,704 A | 3/1993 | Kitamura | |
| 5,398,991 A * | 3/1995 | Smith | A47C 7/72 248/921 |
| 5,790,360 A * | 8/1998 | Ryan | H02H 9/042 361/111 |
| 6,179,263 B1 * | 1/2001 | Rosen | B60R 11/0235 248/278.1 |
| 6,382,577 B1 | 5/2002 | McCoy et al. | |
| 2005/0242594 A1 | 11/2005 | Arakawa | |
| 2015/0048230 A1 * | 2/2015 | Satterfield | F16M 11/126 248/278.1 |

FOREIGN PATENT DOCUMENTS

| | | | |
|---|---|---|---|
| WO | 2006027275 A1 | 3/2006 | |
| WO | WO-2015006388 A2 * | 1/2015 | ............ B60N 2/242 |
| WO | 2018089058 A1 | 5/2018 | |
| WO | WO-2018089058 A1 * | 5/2018 | ............ F16M 11/08 |

* cited by examiner

SPRING CLUTCH ARM ASSEMBLY

FIELD OF THE INVENTION

The field of the invention relates to separable multiple-piece frame assemblies for passenger seats in aircraft or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and/or audio entertainment, including television, video games, internet access, and other on-board entertainment ("OBE") or in-flight entertainment ("IFE") components. Many of these electronic devices are mounted on a moveable arm attached to the passenger seat such that a video screen and/or a receptacle and wired interface for a passenger's personal electronic device ("PED") are attached to the arm of the seat.

The electronic device (OBE, IFE, and/or PED) that is attached to a moveable arm may require one or more articulating hinges and/or joints to hold the electronic device in an ergonomically acceptable position for a passenger. As screen sizes increase for electronic devices included with passenger seats, the mass of the electronic devices and the requisite capabilities for the moveable arm (and passenger seat) also escalate.

In certain situations, it may be desirable to design seats and moveable arms for holding electronic devices with light weight mechanisms capable of supporting significant loads while allowing adjustability for the perceived resistance for movement of the arm in at least one direction.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a spring clutch arm assembly comprises: a moveable arm comprising a retracted configuration and a deployed configuration; a fixed shaft; and a spring portion comprising (i) a moving portion with a distal end and (ii) a coil portion wrapped around the fixed shaft, wherein: the moveable arm comprises a moveable member; the distal end is attached to the moveable member; and the moveable arm is held in the deployed configuration by the spring portion.

The fixed shaft, in certain embodiments, comprises a cylindrical shape and the coil portion comprises a cylindrical opening that approximately corresponds to an outer diameter of the fixed shaft.

In certain embodiments, the spring portion comprises a bushing that interfaces with (i) the fixed shaft and (ii) the coil portion.

In some embodiments, during movement of the moveable arm from the deployed configuration toward the retracted configuration, the coil portion comprises a tension diameter such that friction between the coil portion and the fixed shaft increases, wherein the tension diameter is smaller than an equilibrium diameter of the coil portion.

In some embodiments, during movement of the moveable arm from the retracted configuration toward the deployed configuration, the coil portion comprises a compression diameter such that friction between the coil portion and the fixed shaft decreases, wherein the compression diameter is larger than an equilibrium diameter of the coil portion.

The spring portion, in certain embodiments, causes resistance to movement of the moveable arm from the retracted configuration toward the deployed configuration.

In some embodiments, the bushing comprises an inner diameter that interfaces with an outer cylindrical surface of the fixed shaft, wherein the bushing is adjustable to change the inner diameter.

The bushing, in some embodiments, comprises a clamp fastener to adjust the inner diameter of the bushing.

In certain embodiments, the bushing comprises a cutout that interfaces with the moving portion, wherein a size of the cutout is adjustable.

In some embodiments, the bushing comprises a spring limit fastener to limit the movement of the moving portion relative to the bushing.

According to certain embodiments of the present invention, a rotating arm assembly for a passenger seat comprises: a rotating arm comprising a retracted configuration and a deployed configuration; a fixed shaft that is fixed relative to the passenger seat; a spring comprising (i) a moving portion with a distal end and (ii) a coil portion wrapped around the fixed shaft; and a bushing that interfaces with (i) the fixed shaft and (ii) the coil portion.

In some embodiments, the rotating arm comprises a moveable member; the distal end is attached to the moveable member; and the rotating arm is held in the deployed configuration by the spring.

The fixed shaft, in certain embodiments, comprises a cylindrical shape and the coil portion comprises a cylindrical opening that approximately corresponds to an outer diameter of the fixed shaft.

In certain embodiments, during movement of the rotating arm from the deployed configuration toward the retracted configuration, the coil portion comprises a tension diameter such that friction between the coil portion and the fixed shaft increases, wherein the tension diameter is smaller than an equilibrium diameter of the coil portion.

In some embodiments, during movement of the rotating arm from the retracted configuration toward the deployed configuration, the coil portion comprises a compression diameter such that friction between the coil portion and the fixed shaft decreases, wherein the compression diameter is larger than an equilibrium diameter of the coil portion.

The bushing, in some embodiments, resists movement of the rotating arm from the retracted configuration toward the deployed configuration.

In certain embodiments, the bushing comprises an inner diameter that interfaces with an outer cylindrical surface of the fixed shaft, wherein the bushing is adjustable to change the inner diameter.

The bushing, in certain embodiments, comprises a clamp fastener to adjust the inner diameter of the bushing.

In some embodiments, the bushing comprises a cutout that interfaces with the moving portion, wherein a size of the cutout is adjustable.

In certain embodiments, the bushing comprises a spring limit fastener to limit the movement of the moving portion relative to the bushing.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-9 illustrate embodiments of spring clutch arm assemblies 100 for passenger seats in vehicles such as an aircraft. The spring clutch arm assembly 100 may include a moveable arm 150 attached to a static seat attachment portion 12 where the moveable arm 150 holds an electronic device 10. In some embodiments, the moveable arm 150 rotates about an axis. The moveable arm 150 may include a proximal end 151 attached to the seat attachment portion 12 and a distal end 152 attached to the electronic device 10. As shown in FIGS. 1A-3B, the moveable arm 150 may move between a stowed configuration (see FIGS. 1A and 1B) and a deployed configuration (see FIGS. 3A and 3B). As explained in greater detail below, the spring clutch arm assembly 100 may provide resistance to rotation of the moveable arm 150 to prevent the moveable arm 150 from moving toward the stowed configuration due to the mass of the electronic device 10. In other words, the spring clutch arm assembly 100 can hold the moveable arm 150 in the deployed configuration or in any other configuration between the stowed configuration and the deployed configuration including, for example, an exemplary partially deployed configuration shown in FIGS. 2A and 2B. The spring clutch arm assembly 100 may hold the electronic device 10 in a viewing position and also prevent the electronic device 10 from rapidly moving toward the stowed configuration to avoid potential damage to the electronic device 10 and/or injury to a person located near the seat. The spring clutch arm assembly 100 may provide sufficient resistance that a user (e.g., a passenger, a flight attendant, or any other appropriate person) may push the moveable arm 150 down to the stowed position. In some of the drawings, portions of the moveable arm 150 (including the proximal end 151) are shown transparent to facilitate illustration of the internal components.

Figure 1A:
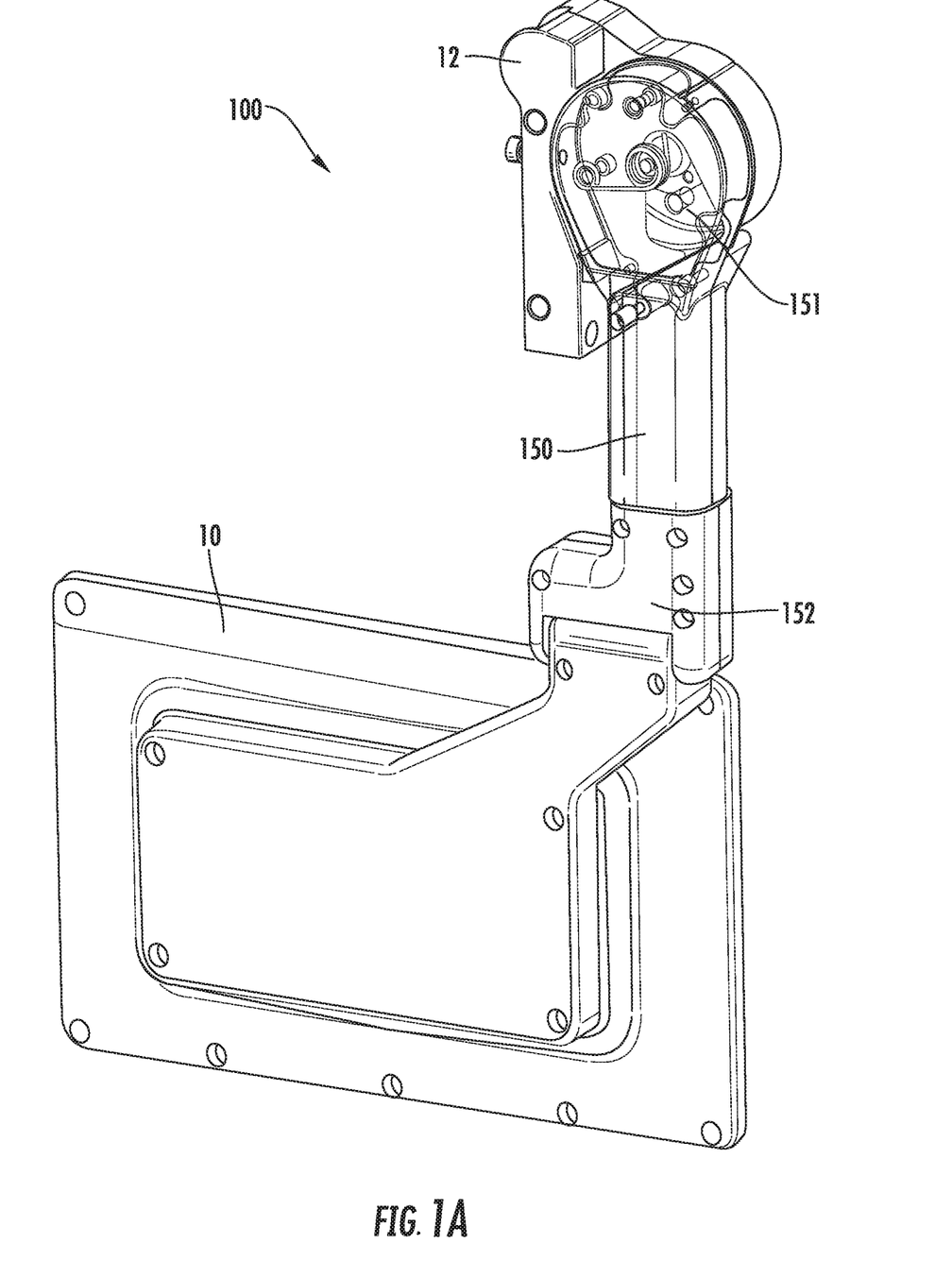
FIG. 1A is a front perspective view of a spring clutch arm assembly in a stowed configuration according to certain embodiments of the present invention.
Figure 1B:
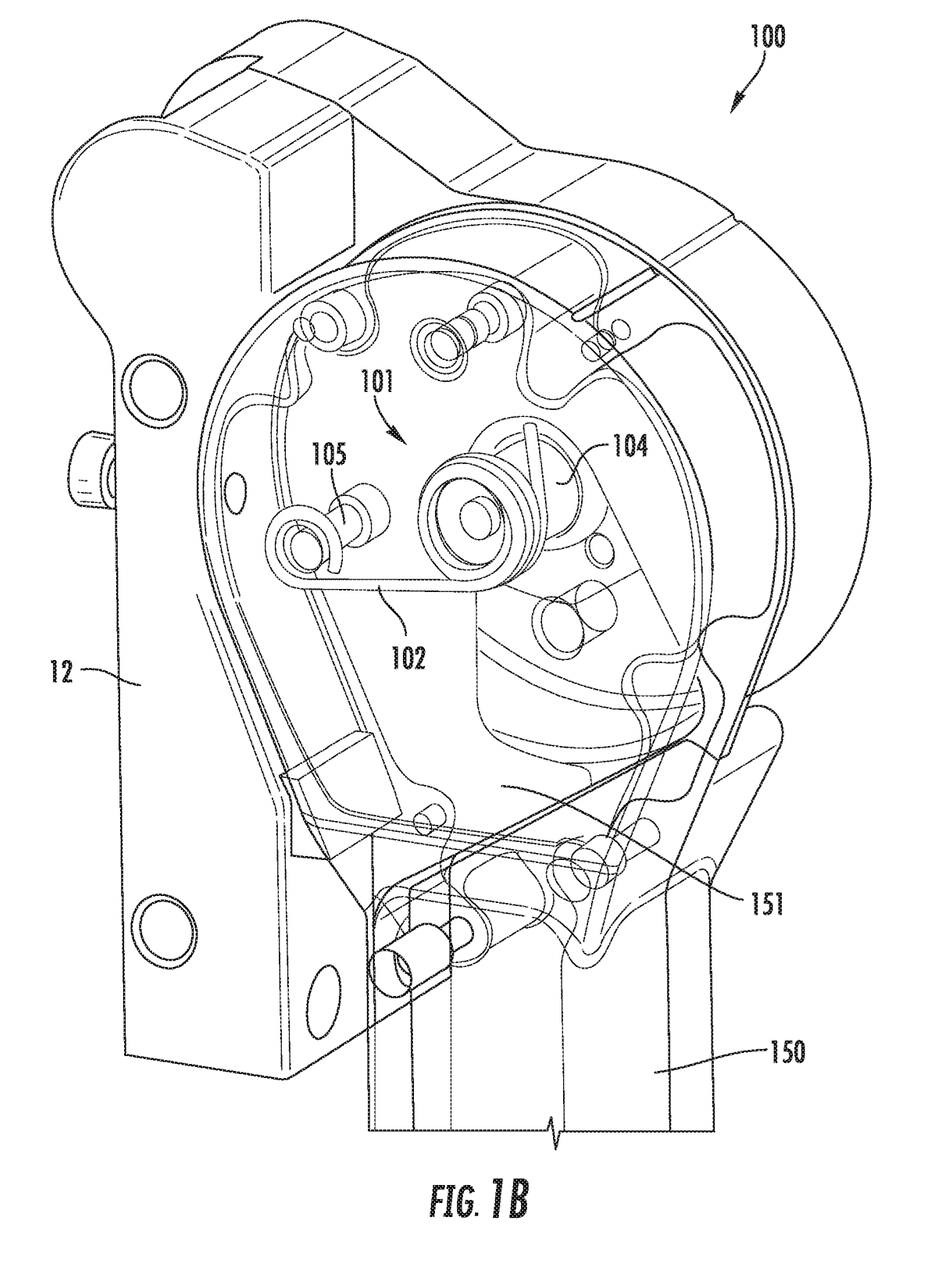
FIG. 1B is a front enlarged perspective view of the spring clutch arm assembly of FIG. 1A.
Figure 2A:
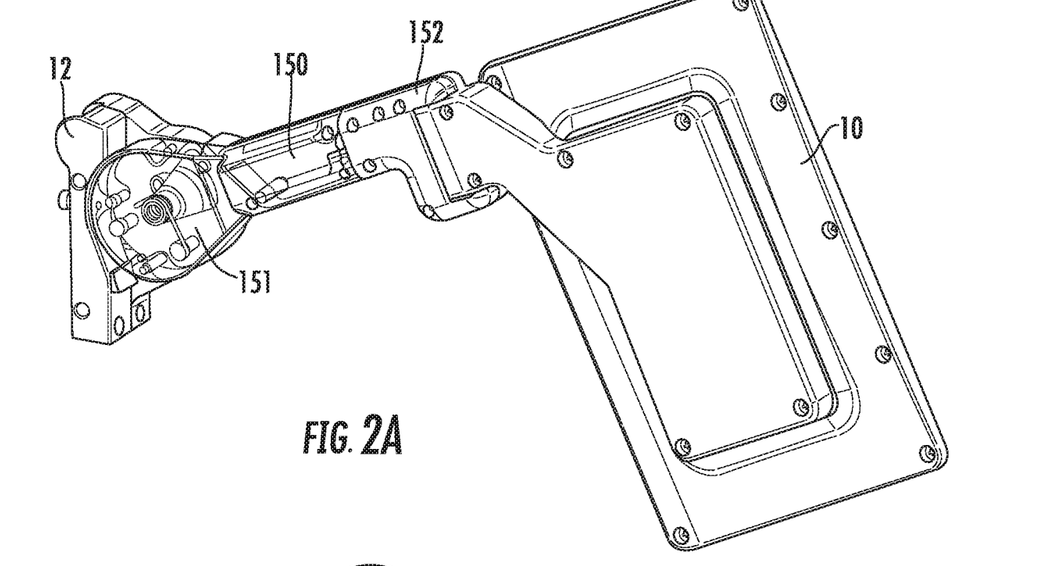
FIG. 2A is a front perspective view of the spring clutch arm assembly of FIG. 1A in a partially deployed configuration.
Figure 2B:
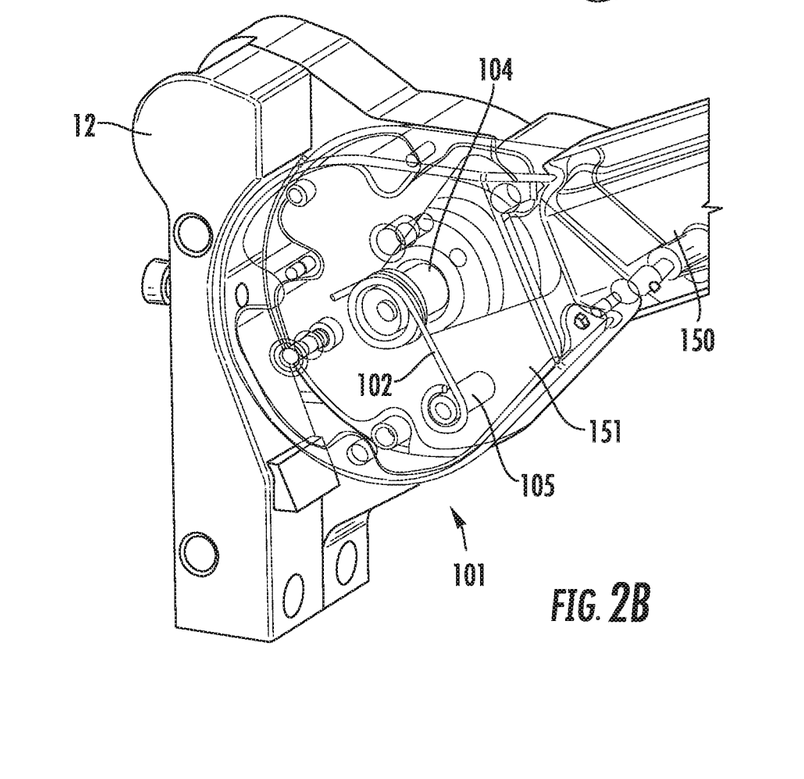
FIG. 2B is a front enlarged perspective view of the spring clutch arm assembly of FIG. 2A.
Figure 3A:
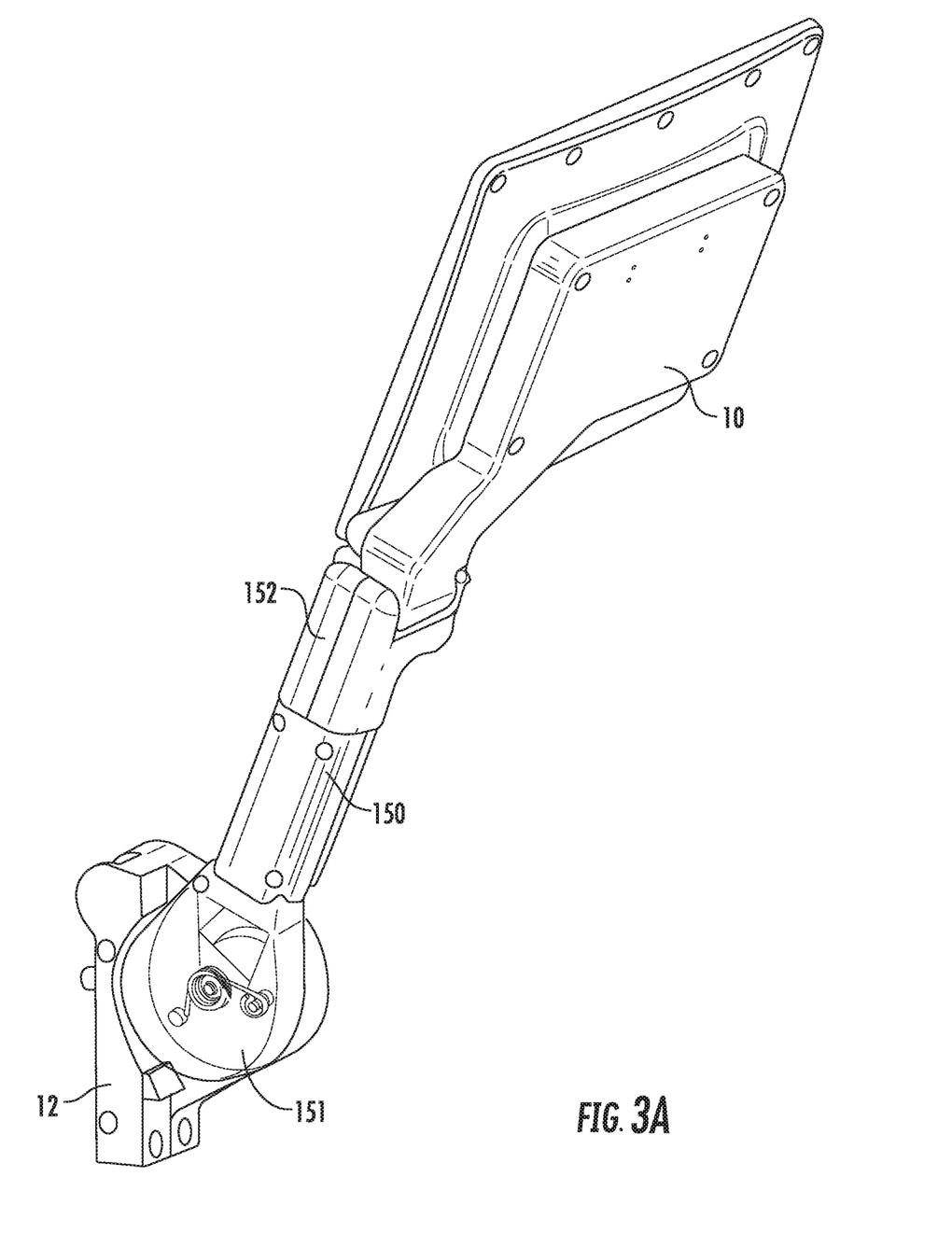
FIG. 3A is a front perspective view of the spring clutch arm assembly of FIG. 1A in a deployed configuration.
Figure 3B:
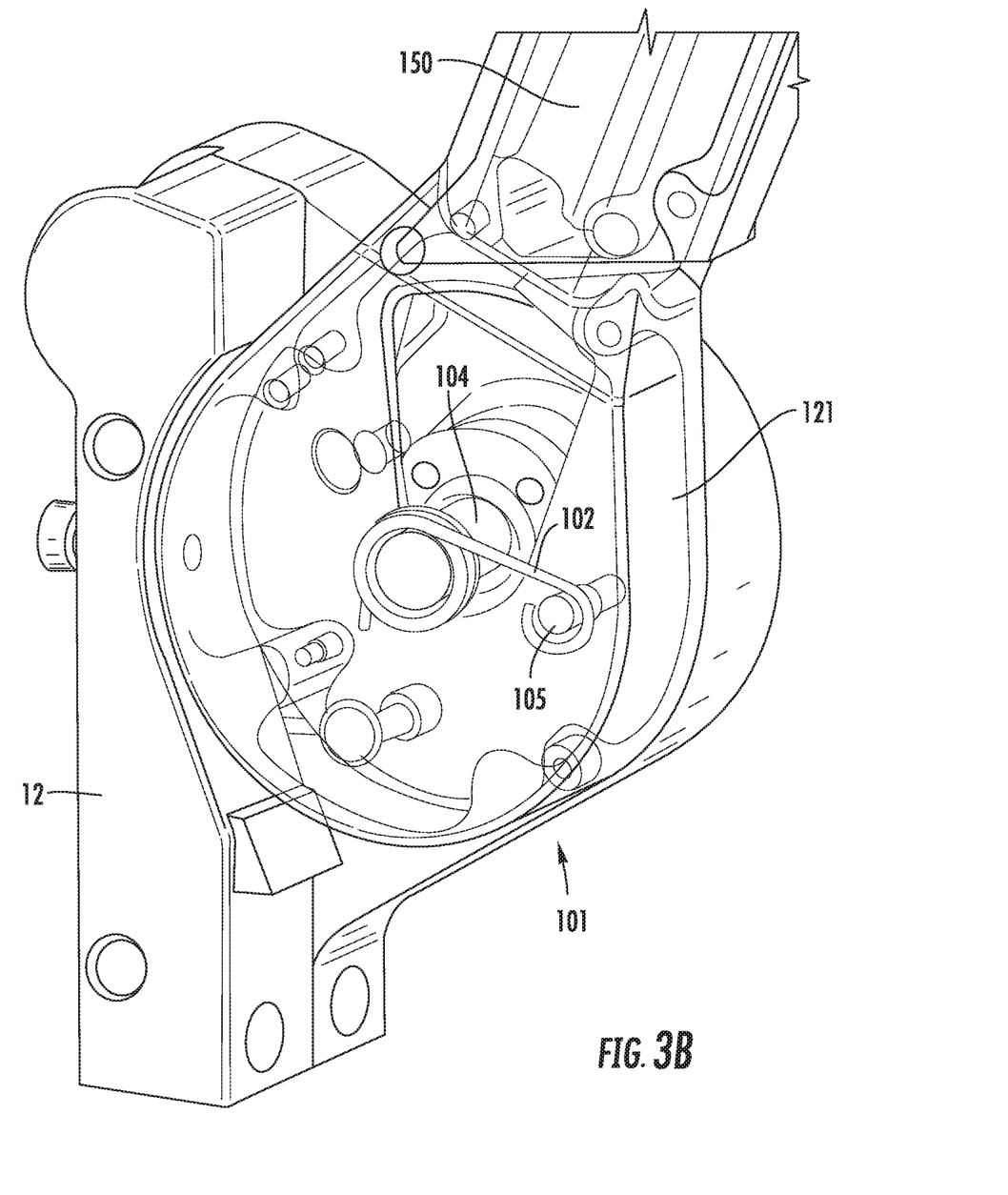
FIG. 3B is a front enlarged perspective view of the spring clutch arm assembly of FIG. 3A.
Figure 4A:
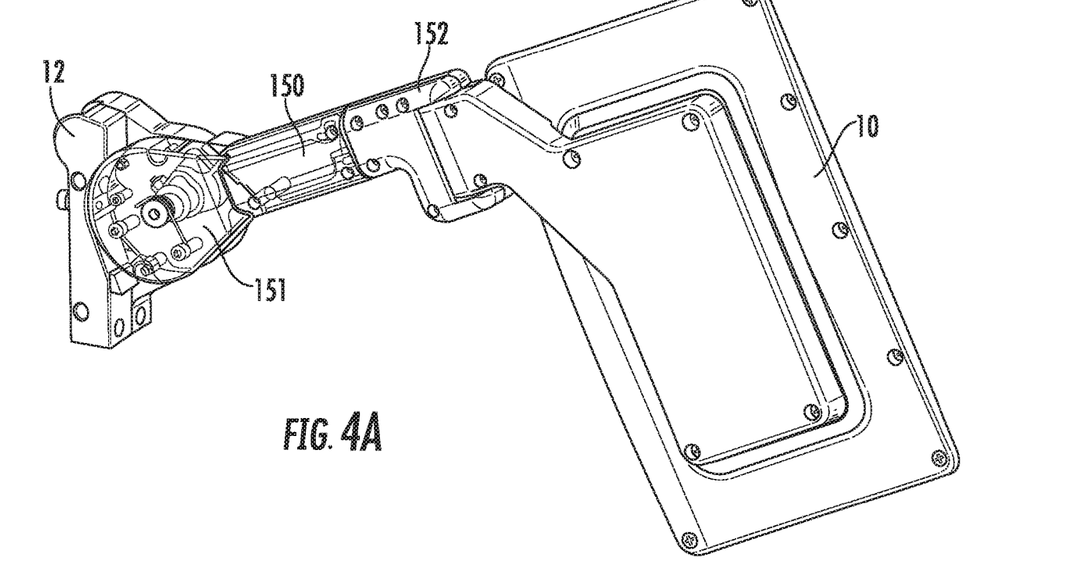
FIG. 4A is a front perspective view of the spring clutch arm assembly of FIG. 1A in a partially stowed configuration.
Figure 4B:
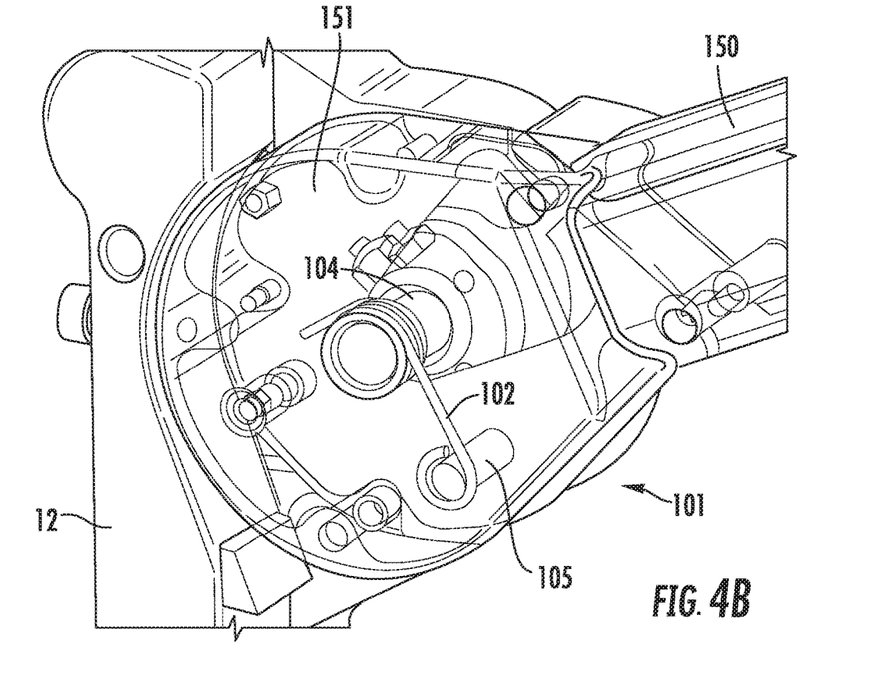
FIG. 4B is a front enlarged perspective view of the spring clutch arm assembly of FIG. 4A.
Figure 5A:
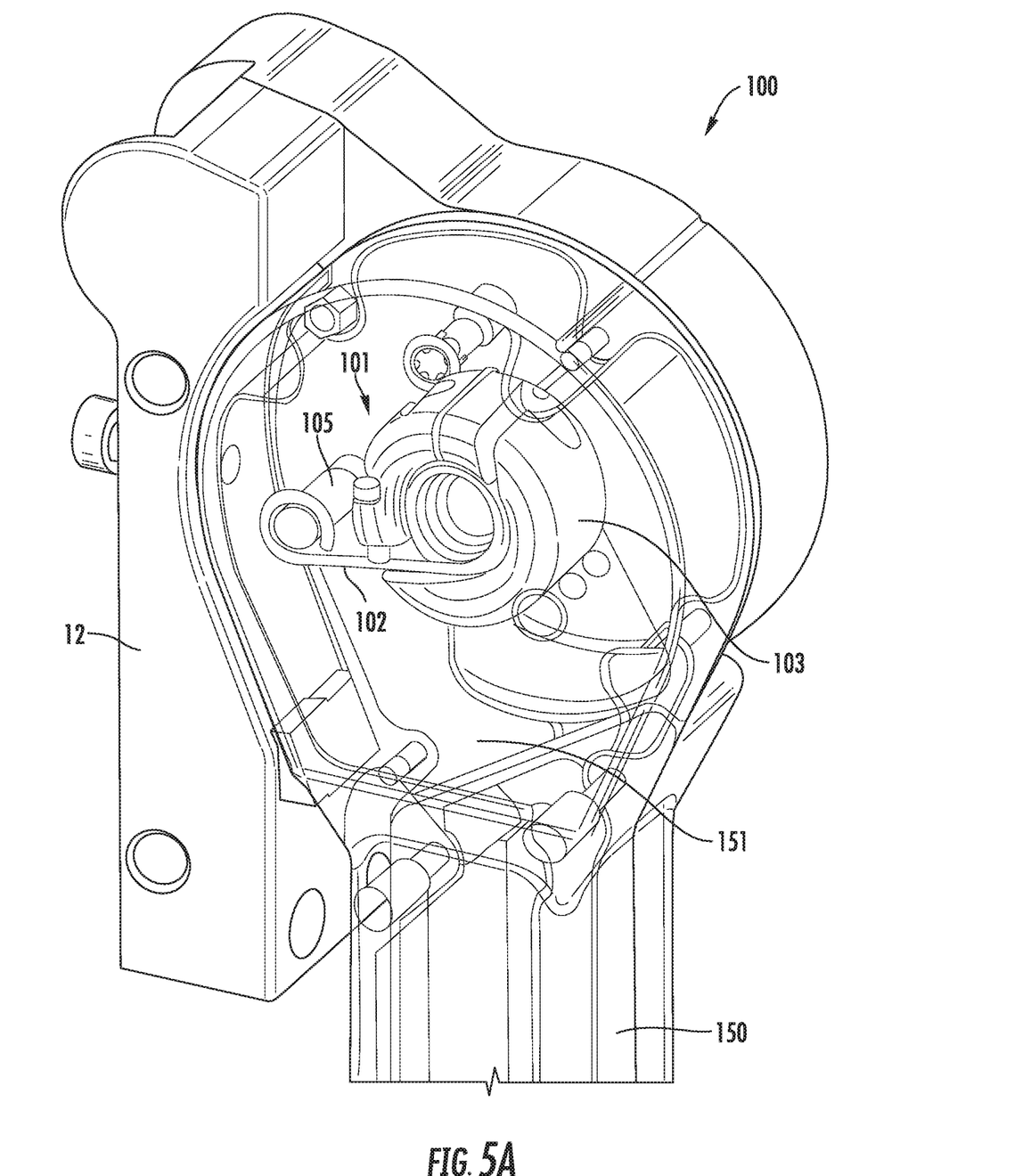
FIG. 5A is a front enlarged perspective view of the spring clutch arm assembly of FIG. 1A.
Figure 5B:
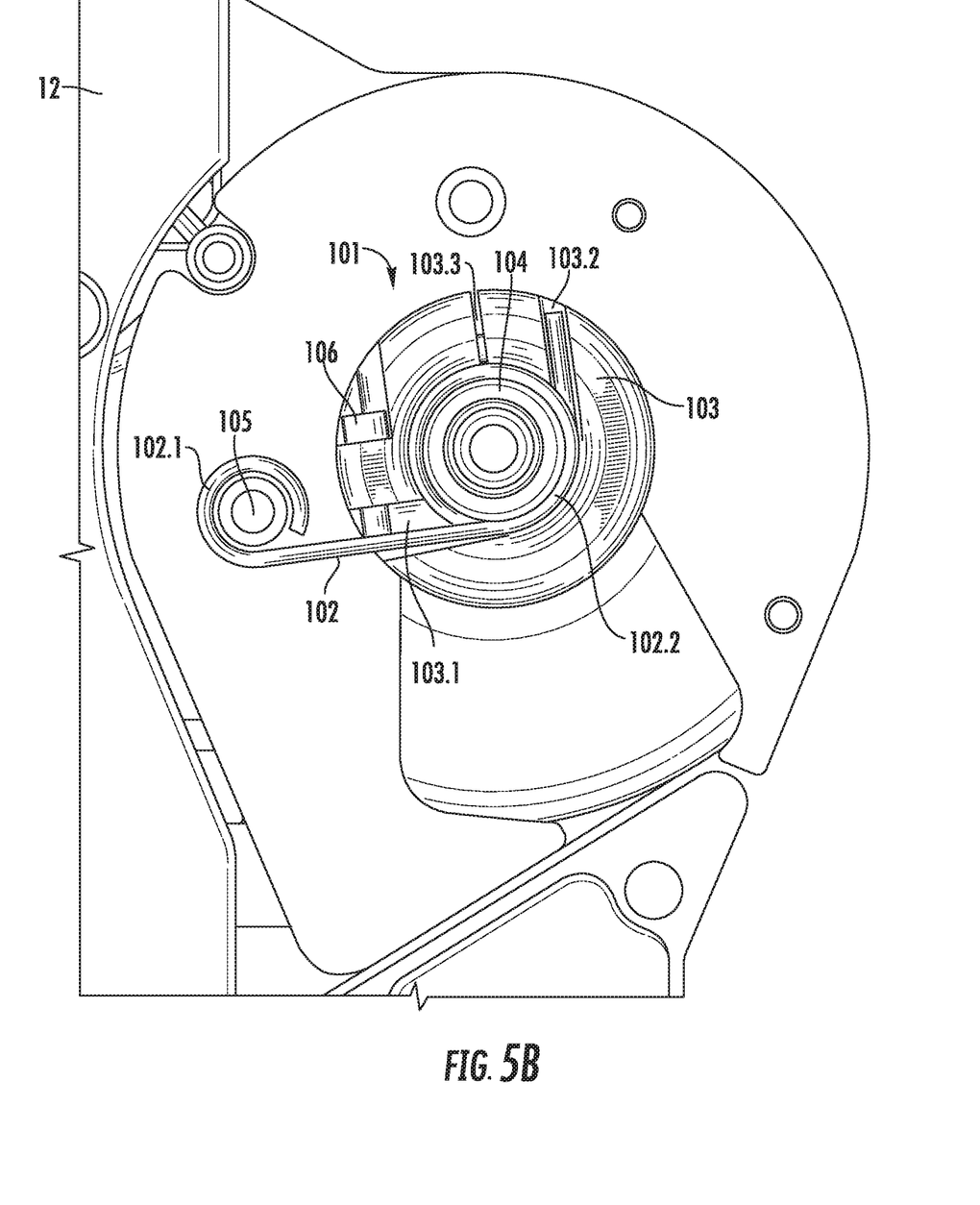
FIG. 5B is a side view of the spring clutch arm assembly of FIG. 5A.

As shown in FIGS. 1B, 2B, and 3B, the spring clutch arm assembly 100 may include a spring assembly 101 having a spring 102 that engages a fixed shaft 104 and a moveable member 105. The fixed shaft 104 may include a cylindrical portion 104.1 and a flange 104.2 (see FIG. 9) that is attached to the seat attachment portion 12 such that the moveable arm 150 (and the moveable member 105) move relative to the fixed shaft 104. In some embodiments, the cylindrical portion 104.1 of the fixed shaft 104 is coaxial with an axis of rotation of the moveable arm 150.

The spring 102 may include a moving portion 102.1, a coil portion 102.2, and a trim portion 102.3 (see FIG. 8) where the coil portion 102.2 interfaces with the cylindrical portion 104.1 of the fixed shaft 104. In some embodiments, the outer diameter of the cylindrical portion 104.1 is closely matched to the inner diameter of the coil portion 102.2 such that the spring 102 has a tight fit on the cylindrical portion 104.1 when the spring 102 is at equilibrium (i.e., the spring 102 is neither in tension nor compression). The fit between the inner cylindrical surface of the coil portion 102.2 (of the spring 102) and the outer surface of the cylindrical portion 104.1 (of the fixed shaft 104) results in friction that creates resistance to relative rotational movement between the spring 102 and the fixed shaft 104. The moving portion 102.1 may include a distal end that interfaces with moveable member 105. In some embodiments, as shown in FIGS. 1B, 2B, and 3B, the distal end of the moving portion 102.1 may include a loop such that the loop of the moving portion 102.1 is capable of moving with moveable member 105 as the moveable member 105 moves relative to the fixed shaft 104. The internal dimension of the loop of the moving portion 102.1 may be larger than the moveable member 105 to provide a loose fit such that the moving portion 102.1 is not constrained relative to rotation about the axis of the moveable member 105.

When the moveable arm 150 moves from the stowed configuration (see FIG. 1B) toward the deployed configuration (see FIG. 3B), the moveable member 105 moves in direction b relative to the fixed shaft 104 (see FIG. 6B) such that the moving portion 102.1 causes the coil portion 102.2 to increase in diameter (i.e., creating a looser fit on fixed shaft 104). In other words, moving the moveable arm 150 toward the deployed configuration increases the inner diameter of the coil portion 102.2 and thus reduces the friction between the spring 102 and the fixed shaft 104 (reducing the perceived resistance created by the interface between the coil portion 102.2 and the fixed shaft 104). The reduced friction between the spring 102 and the fixed shaft 104 allows the moveable arm 150 to move toward the deployed configuration with minimal effort (little or no resistance to movement in this direction, other than gravitational forces due to the mass of the electronic device 10 and/or other relevant components). Motion and/or force that causes the coil portion 102.2 to increase in diameter (as described above) to create a looser fit on fixed shaft 104 will subsequently referred to as compression or compressive force applied to spring 102.

The spring clutch arm assembly 100 is designed to hold the moveable arm 150 in an upright position (i.e., the deployed configuration shown in FIG. 3B, the partially stowed configuration shown in FIG. 4B, or any other configuration between the stowed configuration and the deployed configuration), which allows the spring clutch arm assembly 100 to hold the electronic device 10 in a desired position. In particular, the spring clutch arm assembly 100 is configured to create sufficient friction between the spring 102 and the fixed shaft 104 to (i) overcome the gravitational forces related to the mass of the moveable parts (e.g., the moveable arm 150, the electronic device 10, and any other relevant component) and (ii) create perceived resistance to movement of the moveable arm 150 from the deployed configuration (see FIG. 3B) toward the stowed configuration (see FIG. 1B). When the moveable arm 150 moves from the deployed configuration (see FIG. 3B) toward the stowed configuration (see FIG. 1B), the moveable member 105 moves in direction a relative to the fixed shaft 104 (see FIG. 6A) such that the moving portion 102.1 causes the coil portion 102.2 to decrease in diameter (i.e., creating a tighter fit on fixed shaft 104). In other words, moving the moveable arm 150 toward the stowed configuration decreases the inner diameter of the coil portion 102.2 and thus increases the friction between the spring 102 and the fixed shaft 104 (increasing the perceived resistance created by the interface between the coil portion 102.2 and cylindrical portion 104.1 of the fixed shaft 104). The increased friction between the spring 102 and the fixed shaft 104 allows the moveable arm 150 to move toward the stowed configuration when pressed by a user, but will not move merely due to the mass of the moveable parts (i.e., gravitational forces alone are not sufficient to move the moveable arm 150 toward the stowed configuration). In some embodiments, the friction created by movement of the moveable arm 150 toward the stowed configuration remains constant through the full range of motion of the moveable arm 150. Motion and/or force that causes the coil portion 102.2 to decrease in diameter (as described above) to create a tighter fit on fixed shaft 104 will subsequently referred to as tension or tensile force applied to spring 102.

In some embodiments, the coil portion 102.2 of the spring 102 has an equilibrium diameter, a compression diameter, and a tension diameter. The compression diameter is larger than both the equilibrium diameter and the tension diameter. The tension diameter is smaller than both the equilibrium diameter and the compression diameter.

Figure 8:
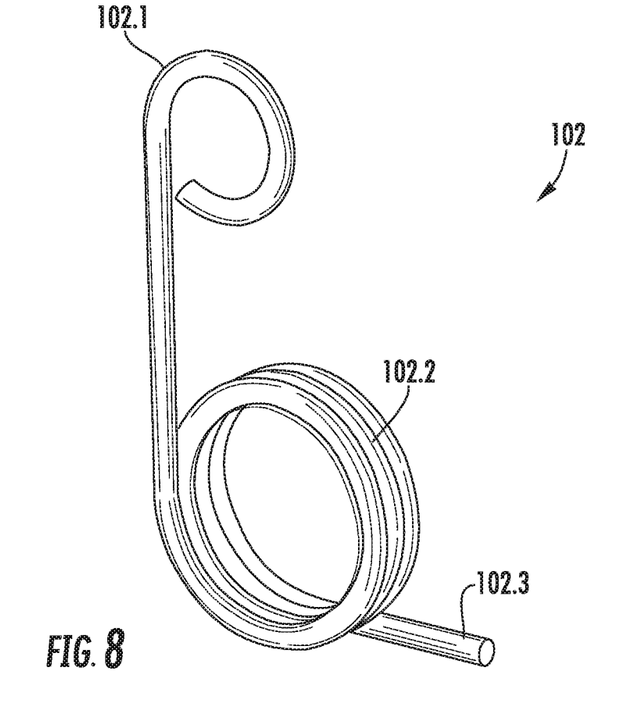
FIG. 8 is a perspective view of a spring of the spring clutch arm assembly of FIG. 1A.
Figure 9:
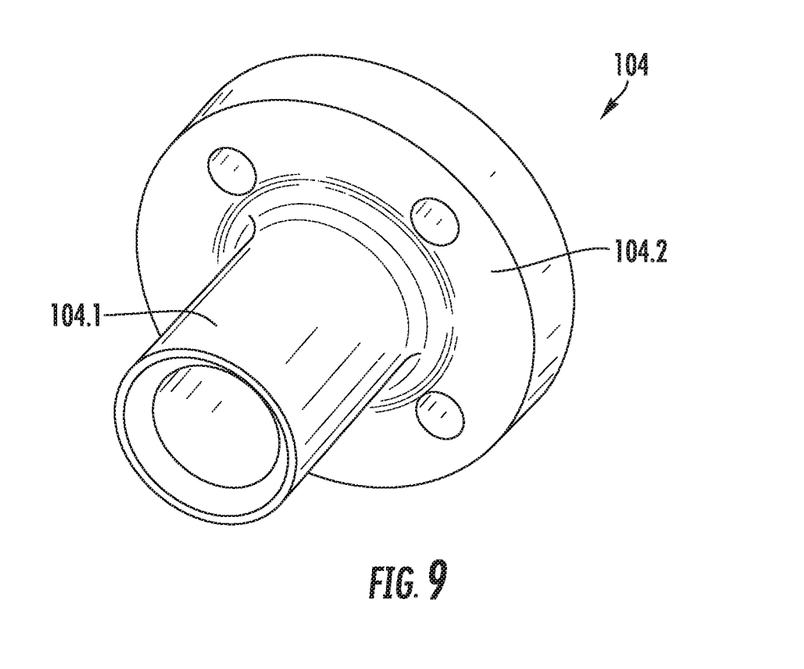
FIG. 9 is a perspective view of a fixed shaft of the spring clutch arm assembly of FIG. 1A.

The magnitude of the friction force created by the interface of the coil portion 102.2 and the cylindrical portion 104.1 can vary based on (1) the relative fit between the inner diameter of the coil portion 102.2 and the outer diameter of the cylindrical portion 104.1, (2) the number of coils of the coil portion 102.2 (e.g., FIG. 8 shows 3-4 coils, but the coil portion 102.2 may have any number of coils, including fewer or more than 3-4 coils), (3) the materials and/or material finishes of the fixed shaft 104 and the spring 102, (4) the spring rate of the spring 102, (5) the dimensions of the wire material of the spring 102, and/or any other relevant factor.

Figure 6A:
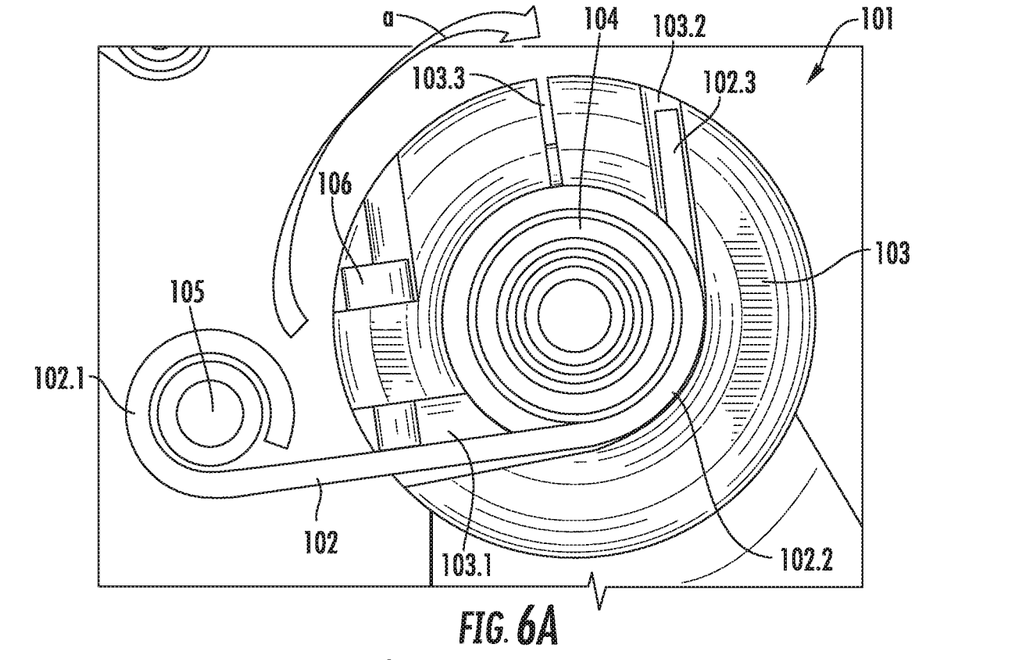
FIGS. 6A and 6B are enlarged side views of the spring clutch arm assembly of FIG. 5A.
Figure 6B:
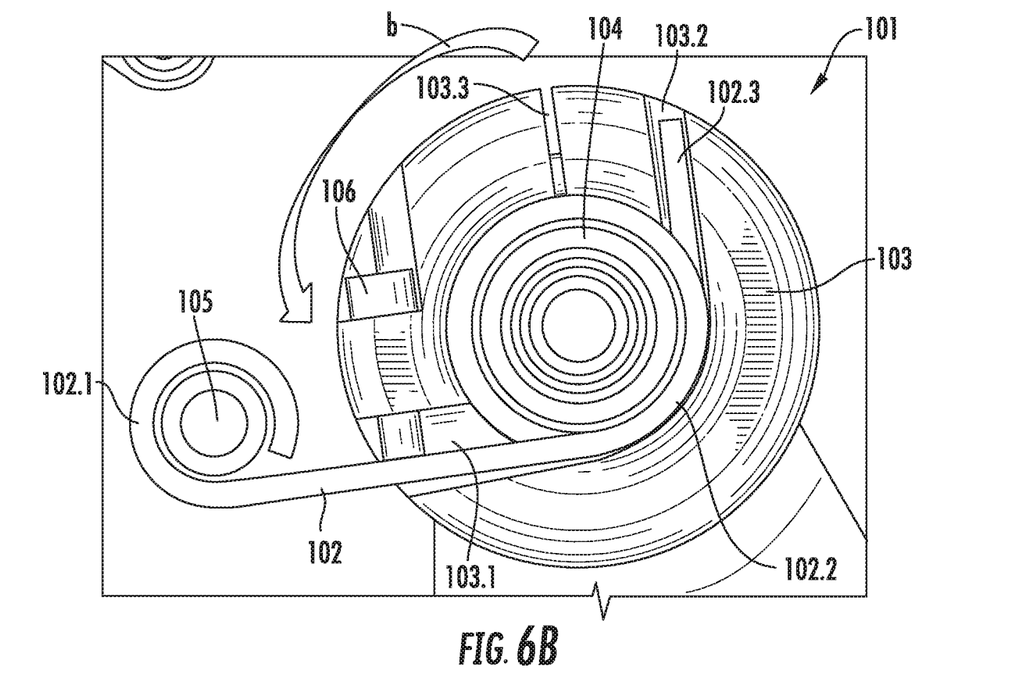
Figure 7A:
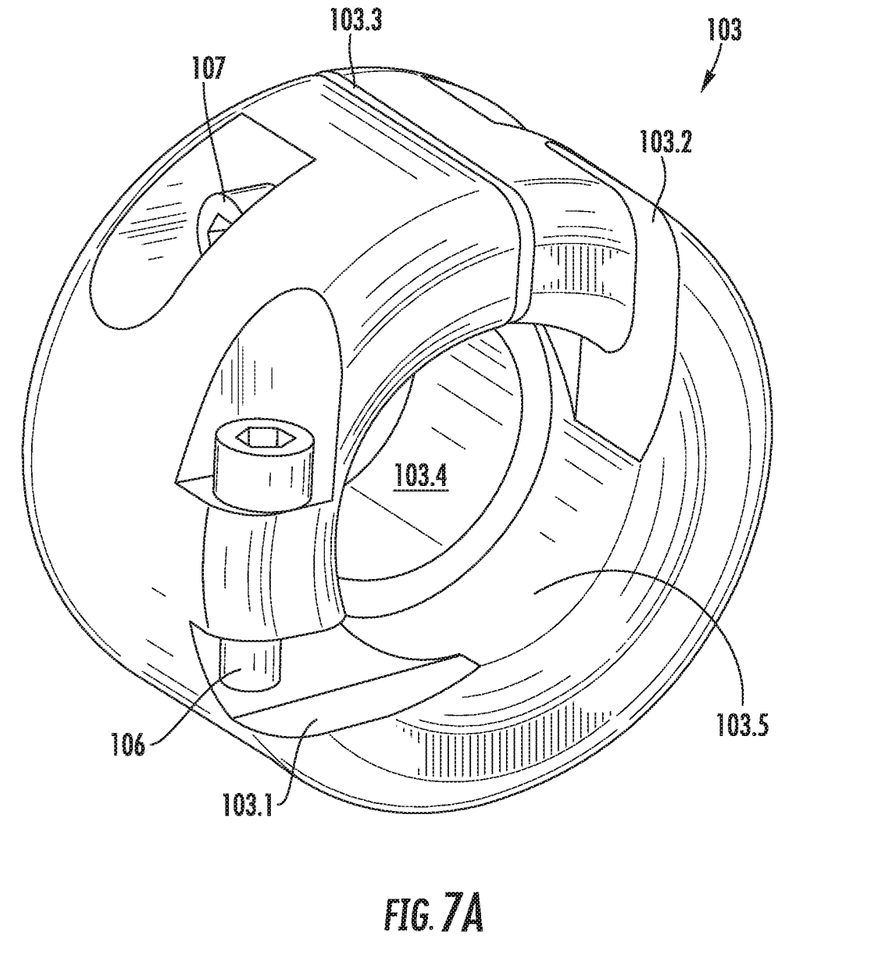
FIG. 7A is a perspective view of a bushing of the spring clutch arm assembly of FIG. 5A.
Figure 7B:
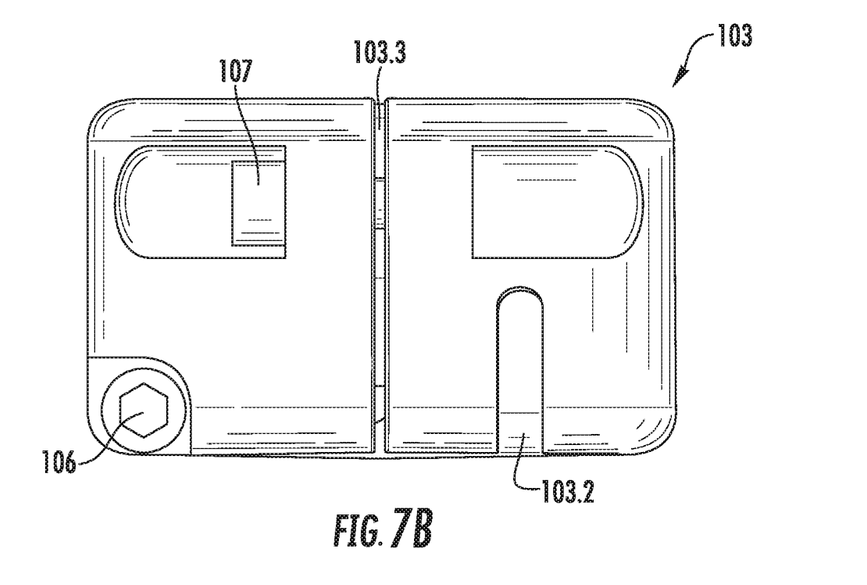
FIG. 7B is a top view of the bushing of FIG. 7A.
Figure 7C:
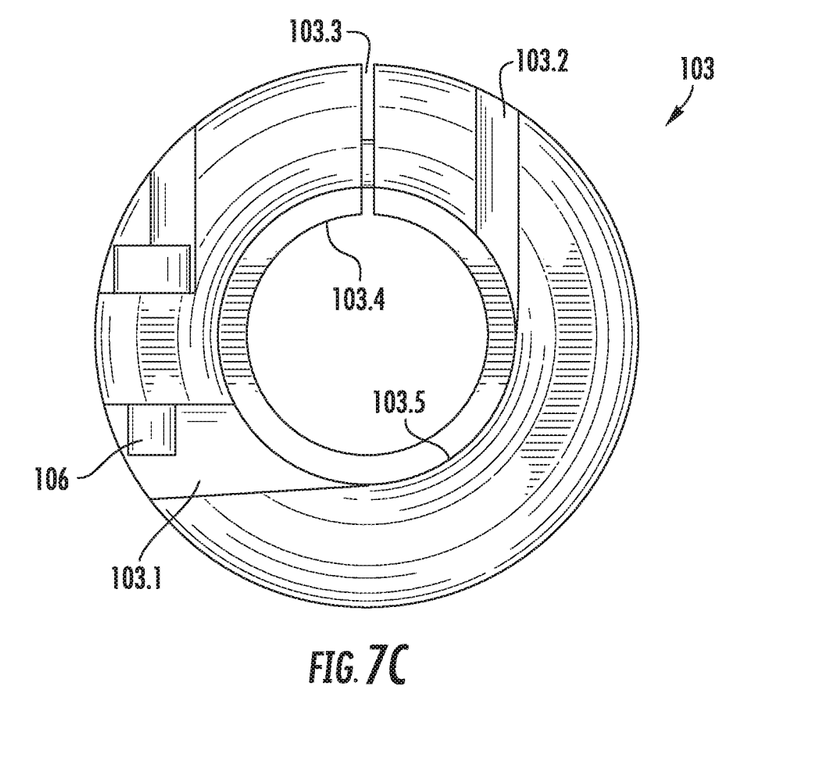
FIG. 7C is a side view of the bushing of FIG. 7A.

As shown in FIGS. 5A-7C, in some embodiments, the spring assembly 101 may include a bushing 103 that interfaces with the spring 102 and the fixed shaft 104. The bushing 103 may have an annular shape and, in some embodiments, may include a gap 103.3 such that the overall dimensions of the bushing 103 are adjustable. As shown in FIGS. 7A and 7C, the bushing 103 may include an innermost cylindrical surface 103.4 having an inner diameter (that interfaces with the outer surface of the cylindrical portion 104.1 of the fixed shaft 104) and a recessed cylindrical surface 103.5 (that interfaces with the outer surface of the coil portion 102.2 of the spring 102). The bushing 103 may be non-metallic, metallic, or any other appropriate material. In some embodiments, the bushing 103 is molybdenum disulfide impregnated nylon, but the bushing 103 may be any other appropriate material. In some embodiments, the bushing 103 may allow one, two, or additional types of adjustability for the spring clutch arm assembly 100.

The bushing 103 rotates with the spring 102 around the fixed shaft 104 (i.e., the bushing 103 rotates with the moveable arm 150). The innermost cylindrical surface 103.4 (which has an inner diameter) interfaces with the cylindrical portion 104.1 of the fixed shaft 104. Because gap 103.3 allows the inner diameter to vary, there is not a tight fit between the bushing 103 and the fixed shaft 104. For a first type of adjustability for the spring clutch arm assembly 100, the bushing 103 may include a clamp fastener 107 that allows the inner diameter to be adjusted to (1) affect friction between the bushing 103 and the fixed shaft 104 and/or (2) adjust for tolerance variations between the bushing 103 and the fixed shaft 104. In other words, the clamp fastener 107 can be (1) tightened to reduce the inner diameter thus increasing friction between the bushing 103 and the fixed shaft 104 and (2) loosened to increase the inner diameter thus decreasing friction between the bushing 103 and the fixed shaft 104. In some embodiments, the friction created between the bushing 103 and the fixed shaft 104 is irrespective of the direction of movement of the moveable arm 150. Thus, in some embodiments, the friction caused by the interface between the bushing 103 and the fixed shaft 104 is adjusted using clamp fastener 107 as the only perceived resistance (other than gravitation forces, as described above) for moving the moveable arm 150 from the stowed configuration toward the deployed configuration (because, as described above, the spring 102 provides little or no resistance to movement in this direction due to compression force). In addition, for motion from the deployed configuration toward the stowed configuration, the friction caused by the interface between the bushing 103 and the fixed shaft 104 is combined with the friction between the spring 102 and the fixed shaft 104 for a cumulative force. Accordingly, in some embodiments, the friction caused by the interface between the bushing 103 and the fixed shaft 104 is adjusted using clamp fastener 107 as supplemental resistance for motion from the deployed configuration toward the stowed configuration.

The spring 102 may fit within the bushing 103 such that the coil portion 102.2 is disposed within recessed cylindrical surface 103.5, the moving portion 102.1 is disposed within adjustable cutout 103.1, and the trim portion 102.3 is disposed within fixed cutout 103.2. For a second type of adjustability for the spring clutch arm assembly 100, the bushing 103 may include a spring limit fastener 106 that allows the dimension of adjustable cutout 103.1 to be changed. As shown in FIGS. 5B-6B, the lower end of spring limit fastener 106 may protrude into adjustable cutout 103.1 and, in some cases, may contact the spring 102. Unthreading spring limit fastener 106 (i.e., moving this fastener up in FIGS. 5B-6B) allows the moving portion 102.1 to move/flex more relative to fixed shaft 104 such that, during movement from the deployed configuration toward the stowed configuration, more tension is applied to spring 102. Thus, unthreading spring limit fastener 106 (increasing the size of adjustable cutout 103.1) increases perceived resistance during movement from the deployed configuration toward the stowed configuration (but does not affect movement from the stowed configuration toward the deployed configuration). Similarly, threading spring limit fastener 106 (decreasing the size of adjustable cutout 103.1) decreases perceived resistance during movement from the deployed configuration toward the stowed configuration (but does not affect movement from the stowed configuration toward the deployed configuration).

The components of the spring clutch arm assembly 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the spring clutch arm assembly 100 may be attached to one another via suitable fasteners, which include, but are not limited to, screws, bolts, rivets or other mechanical or chemical fasteners.

In the following, further examples are described to facilitate understanding of aspects of the invention:

Example A. A spring clutch arm assembly comprising:
  a moveable arm comprising a retracted configuration and a deployed configuration;
  a fixed shaft; and
  a spring portion comprising (i) a moving portion with a distal end and (ii) a coil portion wrapped around the fixed shaft, wherein:
  the moveable arm comprises a moveable member;
  the distal end is attached to the moveable member; and
  the moveable arm is held in the deployed configuration by the spring portion.

Example B. The spring clutch arm assembly of Example A or any of the preceding or subsequent examples, wherein the fixed shaft comprises a cylindrical shape and the coil portion comprises a cylindrical opening that approximately corresponds to an outer diameter of the fixed shaft.

Example C. The spring clutch arm assembly of Example A or any of the preceding or subsequent examples, wherein the spring portion comprises a bushing that interfaces with (i) the fixed shaft and (ii) the coil portion.

Example D. The spring clutch arm assembly of Example A or any of the preceding or subsequent examples, wherein, during movement of the moveable arm from the deployed configuration toward the retracted configuration, the coil portion comprises a tension diameter such that friction between the coil portion and the fixed shaft increases, wherein the tension diameter is smaller than an equilibrium diameter of the coil portion.

Example E. The spring clutch arm assembly of Example A or any of the preceding or subsequent examples, wherein, during movement of the moveable arm from the retracted configuration toward the deployed configuration, the coil portion comprises a compression diameter such that friction between the coil portion and the fixed shaft decreases, wherein the compression diameter is larger than an equilibrium diameter of the coil portion.

Example F. The spring clutch arm assembly of Example A or any of the preceding or subsequent examples, wherein the spring portion causes resistance to movement of the moveable arm from the retracted configuration toward the deployed configuration.

Example G. The spring clutch arm assembly of Example C or any of the preceding or subsequent examples, wherein the bushing comprises an inner diameter that interfaces with an outer cylindrical surface of the fixed shaft, wherein the bushing is adjustable to change the inner diameter.

Example H. The spring clutch arm assembly of Example G or any of the preceding or subsequent examples, wherein the bushing comprises a clamp fastener to adjust the inner diameter of the bushing.

Example I. The spring clutch arm assembly of Example C or any of the preceding or subsequent examples, wherein the bushing comprises a cutout that interfaces with the moving portion, wherein a size of the cutout is adjustable.

Example J. The spring clutch arm assembly of Example I or any of the preceding or subsequent examples, wherein the bushing comprises a spring limit fastener to limit the movement of the moving portion relative to the bushing.

Example K. A rotating arm assembly for a passenger seat comprising:
  a rotating arm comprising a retracted configuration and a deployed configuration;
  a fixed shaft that is fixed relative to the passenger seat;
  a spring comprising (i) a moving portion with a distal end and (ii) a coil portion wrapped around the fixed shaft; and
  a bushing that interfaces with (i) the fixed shaft and (ii) the coil portion.

Example L. The rotating arm assembly of Example K or any of the preceding or subsequent examples, wherein:
  the rotating arm comprises a moveable member;
  the distal end is attached to the moveable member; and
  the rotating arm is held in the deployed configuration by the spring.

Example M. The rotating arm assembly of Example K or any of the preceding or subsequent examples, wherein the fixed shaft comprises a cylindrical shape and the coil portion comprises a cylindrical opening that approximately corresponds to an outer diameter of the fixed shaft.

Example N. The rotating arm assembly of Example K or any of the preceding or subsequent examples, wherein, during movement of the rotating arm from the deployed configuration toward the retracted configuration, the coil portion comprises a tension diameter such that friction between the coil portion and the fixed shaft increases, wherein the tension diameter is smaller than an equilibrium diameter of the coil portion.

Example O. The rotating arm assembly of Example K or any of the preceding or subsequent examples, wherein, during movement of the rotating arm from the retracted configuration toward the deployed configuration, the coil portion comprises a compression diameter such that friction between the coil portion and the fixed shaft decreases, wherein the compression diameter is larger than an equilibrium diameter of the coil portion.

Example P. The rotating arm assembly of Example K or any of the preceding or subsequent examples, wherein the bushing resists movement of the rotating arm from the retracted configuration toward the deployed configuration.

Example Q. The rotating arm assembly of Example K or any of the preceding or subsequent examples, wherein the bushing comprises an inner diameter that interfaces with an outer cylindrical surface of the fixed shaft, wherein the bushing is adjustable to change the inner diameter.

Example R. The rotating arm assembly of Example Q or any of the preceding or subsequent examples, wherein the bushing comprises a clamp fastener to adjust the inner diameter of the bushing.

Example S. The rotating arm assembly of Example K or any of the preceding or subsequent examples, wherein the bushing comprises a cutout that interfaces with the moving portion, wherein a size of the cutout is adjustable.

Example T. The rotating arm assembly of Example S or any of the preceding or subsequent examples, wherein the bushing comprises a spring limit fastener to limit the movement of the moving portion relative to the bushing.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A spring clutch arm assembly comprising:
   a moveable arm comprising a retracted configuration and a deployed configuration;
   a fixed shaft; and
   a spring portion comprising (i) a moving portion with a distal end, (ii) a coil portion wrapped around the fixed shaft, and (iii) a bushing that interfaces with the fixed shaft and the coil portion, wherein:
   the bushing comprises a cutout that interfaces with the moving portion;
   a size of the cutout is adjustable;
   the moveable arm comprises a moveable member;
   the distal end is attached to the moveable member; and
   the moveable arm is held in the deployed configuration by the spring portion.

2. The spring clutch arm assembly of claim 1, wherein the fixed shaft comprises a cylindrical shape and the coil portion comprises a cylindrical opening that approximately corresponds to an outer diameter of the fixed shaft.

3. The spring clutch arm assembly of claim 1, wherein, during movement of the moveable arm from the deployed configuration toward the retracted configuration, the coil portion comprises a tension diameter such that friction between the coil portion and the fixed shaft increases, wherein the tension diameter is smaller than an equilibrium diameter of the coil portion.

4. The spring clutch arm assembly of claim 1, wherein, during movement of the moveable arm from the retracted configuration toward the deployed configuration, the coil portion comprises a compression diameter such that friction between the coil portion and the fixed shaft decreases, wherein the compression diameter is larger than an equilibrium diameter of the coil portion.

5. The spring clutch arm assembly of claim 1, wherein the spring portion causes resistance to movement of the moveable arm from the retracted configuration toward the deployed configuration.

6. The spring clutch arm assembly of claim 1, wherein the bushing comprises an inner diameter that interfaces with an outer cylindrical surface of the fixed shaft, wherein the bushing is adjustable to change the inner diameter.

7. The spring clutch arm assembly of claim 6, wherein the bushing comprises a clamp fastener to adjust the inner diameter of the bushing.

8. The spring clutch arm assembly of claim 1, wherein the bushing comprises a spring limit fastener to limit movement of the moving portion relative to the bushing.

9. A rotating arm assembly for a passenger seat comprising:
   a rotating arm comprising a retracted configuration and a deployed configuration; a fixed shaft that is fixed relative to the passenger seat;
   a spring comprising (i) a moving portion with a distal end and (ii) a coil portion wrapped around the fixed shaft; and
   a bushing that interfaces with (i) the fixed shaft and (ii) the coil portion, wherein:
   the bushing comprises an inner diameter that interfaces with an outer cylindrical surface of the fixed shaft; and
   the bushing is adjustable to change the inner diameter.

10. The rotating arm assembly of claim 9, wherein:
    the rotating arm comprises a moveable member;
    the distal end is attached to the moveable member; and
    the rotating arm is held in the deployed configuration by the spring.

11. The rotating arm assembly of claim 9, wherein the fixed shaft comprises a cylindrical shape and the coil portion comprises a cylindrical opening that approximately corresponds to an outer diameter of the fixed shaft.

12. The rotating arm assembly of claim 9, wherein, during movement of the rotating arm from the deployed configuration toward the retracted configuration, the coil portion comprises a tension diameter such that friction between the coil portion and the fixed shaft increases, wherein the tension diameter is smaller than an equilibrium diameter of the coil portion.

13. The rotating arm assembly of claim 9, wherein, during movement of the rotating arm from the retracted configuration toward the deployed configuration, the coil portion comprises a compression diameter such that friction between the coil portion and the fixed shaft decreases, wherein the compression diameter is larger than an equilibrium diameter of the coil portion.

14. The rotating arm assembly of claim 9, wherein the bushing resists movement of the rotating arm from the retracted configuration toward the deployed configuration.

15. The rotating arm assembly of claim 9, wherein the bushing comprises a clamp fastener to adjust the inner diameter of the bushing.

16. A rotating arm assembly for a passenger seat comprising:
    a rotating arm comprising a retracted configuration and a deployed configuration; a fixed shaft that is fixed relative to the passenger seat;

a spring comprising (i) a moving portion with a distal end and (ii) a coil portion wrapped around the fixed shaft; and a bushing that interfaces with (i) the fixed shaft and (ii) the coil portion, wherein:

the bushing comprises a cutout that interfaces with the moving portion; and a size of the cutout is adjustable.

17. The rotating arm assembly of claim 16, wherein the bushing comprises a spring limit fastener to limit movement of the moving portion relative to the bushing.

* * * * *